(12) United States Patent
Wu et al.

(10) Patent No.: US 7,023,767 B2
(45) Date of Patent: Apr. 4, 2006

(54) GAIN CALIBRATION DEVICE AND METHOD FOR DIFFERENTIAL PUSH-PULL TRACKING ERROR SIGNALS

(75) Inventors: Wen-Yi Wu, Hsin Chu (TW); Jin-Chuan Hsu, Hsinchu (TW); Bruce Hsu, Hsinchu (TW)

(73) Assignee: Media Tek Inc., Hsin Chu (TW)

( * ) Notice: Subject to any disclaimer, the term of this patent is extended or adjusted under 35 U.S.C. 154(b) by 617 days.

(21) Appl. No.: 10/143,756

(22) Filed: May 14, 2002

(65) Prior Publication Data

US 2003/0026177 A1 Feb. 6, 2003

(30) Foreign Application Priority Data

May 15, 2001 (TW) .............................. 90111661 A

(51) Int. Cl.
*G11B 7/095* (2006.01)

(52) U.S. Cl. .............................. 369/44.29; 369/44.37; 369/44.41; 369/44.35

(58) Field of Classification Search ............. 369/44.29, 369/44.35, 44.3, 44.41, 47.55, 53.45, 116, 369/44.34, 44.55
See application file for complete search history.

(56) References Cited

U.S. PATENT DOCUMENTS

| | | | |
|---|---|---|---|
| 5,168,487 A * | 12/1992 | Ohsato et al. | 369/44.37 |
| 6,181,651 B1 * | 1/2001 | Kishimoto et al. | 369/44.28 |
| 6,606,286 B1 * | 8/2003 | Maekawa | 369/47.17 |
| 6,654,323 B1 * | 11/2003 | Takasaki et al. | 369/44.41 |

* cited by examiner

*Primary Examiner*—A M Psitos
(74) *Attorney, Agent, or Firm*—Birch, Stewart, Kolasch & Birch

(57) ABSTRACT

A gain calibration device and method for differential push-pull (DPP) tracking error signals in an optical storage system is provided. The gain calibration method processes the synthesized gain (SPPG) of the sub beam in the DPP tracking error signal components with respect to the main beam. The calibration theorem resides in controlling the objective lens of the pick-up head to form a lens-shift or controlling the tilt of the objective lens relative to the optical disc to make the synthesized DPP tracking error signals generate a correspondingly signal variation owing to the optical path deviation. The synthesized gain is calibrated to make the signal variation a minimum value, and the calibrated synthesized gain is the optimum value. In the method and device of the invention, the optimum synthesized gain of the sub beam is precisely computed without the assumptions of equal intensity of the two sub beams and symmetrical positions of the two sub beams with respect to the main beam, and without knowing the ratio of the pitch between the two sub beams to the track pitch.

16 Claims, 5 Drawing Sheets

GAIN CALIBRATION DEVICE AND METHOD FOR DIFFERENTIAL PUSH-PULL TRACKING ERROR SIGNALS

BACKGROUND OF THE INVENTION

1. Field of the Invention

The invention relates to a gain calibration device and method for differential push-pull (hereinafter referred to as DPP) tracking error signals in an optical storage system, and more specifically to a calibration device and method for calibrating the sub beam in the DPP signal component with respect to the synthesized gain (hereinafter referred to as SPPG) of the main beam.

2. Description of the Related Art

FIG. 1 shows the configuration of laser spots on optical discs for the DPP-based tracking error synthesis. As shown in FIG. 1, in the general DPP-based tracking error synthesis, there are three laser beams, including a main beam 12, a first sub beam 13, and a second sub beam 14, projected on the optical disc. Therefore, the DPP tracking error signal TE may be represented as the differential synthesis of the push-pull signal MPP of the main beam 12 and the push-pull signals SPP of the sub beams 13 and 14, as shown in Equation (1):

$$TE = MPP - \alpha \cdot SPP \qquad (1)$$

wherein $\alpha$ is the synthesized gain SPPG of the push-pull signals SPP of the sub beams 13 and 14 with respect to the push-pull signal MPP of the main beam 12.

According to the arranged configuration of laser spots on the optical disc as shown in FIG. 1, the push-pull signal MPP of the main beam 12 and the push-pull signals SPP of the sub beams 13 and 14 can be represented as Equations (2) and (3):

$$MPP = A_m \cdot \sin\left(\frac{2\pi x}{P}\right) + A_m \cdot K(\text{tilt}) + C_m \qquad (2)$$

$$\begin{aligned}
SPP &= SPP1 + SPP2 \qquad (3)\\
&= \left[A_{S1} \cdot \sin\left(\frac{2\pi \cdot (x - Q_1)}{P}\right) + A_{S1} \cdot K(\text{tilt}) + C_{S1}\right] + \\
&\quad \left[A_{S2} \cdot \sin\left(\frac{2\pi \cdot (x + Q_2)}{P}\right) + A_{S2} \cdot K(\text{tilt}) + C_{S2}\right] \\
&= \left(A_{S1} \cdot \cos\left(\frac{2\pi Q_1}{P}\right) + A_{S2} \cdot \cos\left(\frac{2\pi Q_2}{P}\right)\right) \cdot \sin\left(\frac{2\pi x}{P}\right) + \\
&\quad \left(A_{S2} \cdot \sin\left(\frac{2\pi Q_2}{P}\right) - A_{S1} \cdot \sin\left(\frac{2\pi Q_1}{P}\right)\right) \cdot \cos\left(\frac{2\pi x}{P}\right) + \\
&\quad (A_{S1} + A_{S2}) \cdot K(\text{tilt}) + (C_{S1} + C_{S2})
\end{aligned}$$

wherein symbol x is the offset from the spot center 15 of the main beam 12 to the center 10 of the groove, and is a function of time t. Items related to x are the so-called AC components having higher frequency content than the tilt and affected by the disc runout. Symbols $Q_1$ and $Q_2$ are the distances between the spot centers 16 and 17 of the first and second sub beams 13 and 14 to the spot center 15 of the main beam 12, respectively. Symbol P is the data track pitch (i.e., the distance between the groove centers 10 and 10') on the optical disc. Symbols $A_m$, $A_{s1}$, and $A_{s2}$ are the AC amplitudes of the tracking error signal TE, and are also the amplitudes of the runout. Symbols $C_m$, $C_{s1}$, $C_{s2}$ are the circuit signal offsets (OFFSET) of the OP amplifiers of the front-stage amplifier (RFIC) and the optical signal amplifier (PDIC). K(tilt) is a variable directly proportional to the tilt of the pick-up head, and the tilt of the pick-up head is caused by the lens-shift or the optical mechanism error.

Therefore, substituting Equations (2) and (3) into Equation (1), the tracking error signal TE is represented as Equation (4):

$$\begin{aligned}
TE &= MPP - \alpha \cdot SPP \qquad (4)\\
&= \left(A_m - \alpha \cdot \left(A_{S1} \cdot \cos\left(\frac{2\pi Q_1}{P}\right) + A_{S2} \cdot \cos\left(\frac{2\pi Q_2}{P}\right)\right)\right) \cdot \\
&\quad \sin\left(\frac{2\pi x}{P}\right) - \alpha \cdot \left(A_{S2} \cdot \sin\left(\frac{2\pi Q_2}{P}\right) - A_{S1} \cdot \sin\left(\frac{2\pi Q_1}{P}\right)\right) \cdot \\
&\quad \cos\left(\frac{2\pi x}{P}\right) + (A_m - \alpha \cdot (A_{S1} + A_{S2})) \cdot K(\text{tilt}) + (C_m - \\
&\quad \alpha \cdot (C_{S1} + C_{S2}))
\end{aligned}$$

In order to prevent the tracking error signal TE from being influenced by the variable of K(tilt), a proper value of the synthesized gain SPPG is generally set to make the third item in Equation (4) equal to 0. In the conventional method, it is assumed that:

1. $A_{s1} = A_{s2} = As$;
2. $Q_1 = Q_2 = Q$; and
3. Q/P is known.

Substituting the assumed values into Equation (4), the Equation (4) is simplified as Equation (5):

$$\begin{aligned}
TE &= MPP - \alpha \cdot SPP \qquad (5)\\
&= \left(A_m - \alpha \cdot 2 \cdot A_S \cdot \cos\left(\frac{2\pi Q}{P}\right)\right) \cdot \sin\left(\frac{2\pi x}{P}\right) + (A_m - \alpha \cdot 2 \cdot A_S) \cdot \\
&\quad K(\text{tilt}) + (C_m - \alpha \cdot (C_{S1} + C_{S2}))
\end{aligned}$$

Therefore, the AC items of the push-pull signals MPP and SPP of the main beam 12 and the sub beams 13 and 14 can be used to calibrate the $\alpha$ value. The calibration method is described as follows:

Step 1: tune the circuit's OFFSET values of $C_m$, $C_{s1}$ and $C_{s2}$ to be 0;

Step 2: measure the amplitude of the AC item of the MPP, i.e., $MA = A_m$;

Step 3: measure the amplitude of the AC item of the SPP, i.e., $$SA = 2 \cdot A_s \cos\left(\frac{2\pi Q}{P}\right);$$

Step 4: define the synthesized gain of SPP, i.e., $$\alpha = \frac{MA \cdot \cos\left(\frac{2\pi Q}{P}\right)}{SA} = \frac{A_m}{2 \cdot A_S};$$

Step 5: substitute the $\alpha$ value obtained from Step 4 into Equation (5), and then, a function only containing AC items is obtained as shown in Equation (6):

$$TE = MPP - \alpha \cdot SPP \qquad (6)$$

-continued $$= \left(A_m - \alpha \cdot 2 \cdot A_S \cdot \cos\left(\frac{2\pi Q}{P}\right)\right) \cdot \sin\left(\frac{2\pi x}{P}\right) + (A_m - \alpha \cdot 2 \cdot A_S) \cdot$$
$$K(\text{tilt}) + (C_m - \alpha \cdot (C_{S1} + C_{S2}))$$
$$= A_m \cdot \left(1 - \cos\left(\frac{2\pi Q}{P}\right)\right) \cdot \sin\left(\frac{2\pi x}{P}\right)$$

It should be noted that the conventional method has to satisfy three assumptions. However, the values of Q/P, $A_{s1}$, $A_{s2}$, $Q_1$, $Q_2$ vary with different pick-up heads and optical discs. Therefore, the information cannot be obtained during the duration for correcting the SPP gain. Accordingly, the correct gain ɩ for SPP cannot be obtained using the conventional method.

SUMMARY OF THE INVENTION

In view of the above-mentioned problems, an object of the invention is to provide a calibration method and device for the synthesized gain SPPG of the DPP tracking signals in an optical storage system. In the method and device of the invention, the optimum SPPG value can be precisely computed without the assumptions of equal intensity of the two sub beams and symmetrical positions of the two sub beams with respect to the main beam, and without knowing the ratio of the pitch between the two sub beams to the track pitch.

To achieve the above-mentioned object, a gain calibration method for DPP (differential push-pull) tracking error signals in an optical storage system of the invention is used for correcting a value of an amplifier gain of a sub beam with respect to an amplifier gain of a main beam. The gain calibration method includes the steps of: powering on a laser light source and focusing laser beams; enabling a spindle motor, and set an initial gain, that is, set an initial gain of the sub beam push-pull amplifier; controlling a first state of an objective lens relative to a disc; measuring a characteristic value of the push-pull signal of the main beam, with respect to an objective lens-shift, as a first main beam characteristic value; measuring a characteristic value of the push-pull signal of the sub beam, with respect to the objective lens-shift, as a first sub beam characteristic value; controlling a second state of the objective lens relative to the disc; measuring a characteristic value of the push-pull signal of the main beam, with respect to an objective lens-shift, as a second main beam characteristic value; measuring a characteristic value of the push-pull signal of the sub beam, with respect to the objective lens-shift, as a second sub beam characteristic value; and computing the gain of the sub beam according to the first main beam characteristic value, first sub beam characteristic value, second main beam characteristic value, and second sub beam characteristic value.

To achieve the above-mentioned object, a gain calibration device for DPP (differential push-pull) tracking error signals in an optical storage system of the invention is used for correcting a value of an amplifier gain of a sub beam with respect to an amplifier gain of a main beam. The gain calibration device includes an optical signal amplifier, a radio frequency receiver, an analog digital converter, and a digital signal processor. The optical signal amplifier receives signals of the main beam and the sub beam from a disc, amplifies the signals, and outputs them as a main beam radio frequency signal and a sub beam radio frequency signal. The radio frequency receiver differentially amplifies, in a front-stage, the main beam radio frequency signal and the sub beam radio frequency signal of the optical signal amplifier, differentially amplifies the amplified signals by a main beam signal amplifier and a sub beam signal amplifier, generates a main beam push-pull signal and a sub beam push-pull signal, and outputs the value of (second main beam characteristic value–first main beam characteristic value) as the DPP tracking error signal. The analog to digital converter receives the main beam push-pull signal and the sub beam push-pull signal from the radio frequency receiver, and generates a digital main beam push-pull signal and a digital sub beam push-pull signal. The digital signal processor receives the digital main to beam push-pull signal and the digital sub beam push-pull signal, extracts characteristic values of the digital main beam push-pull signal and the digital sub beam push-pull signal using a feature extractor, and computes, using a gain computing module, a gain of the sub beam signal amplifier of the radio frequency receiver with respect to the main beam signal amplifier according to the characteristic values of the push-pull signal.

The calibration device and method of the invention can prevent the signal levels of the synthesized DPP tracking error (DPP) signals from being interfered during the deviation of the unstable optical path cause by the lens-shift of the objective lens, or the lens-tilt of the objective lens or optical disc owing to mechanism tolerance during the tracking procedure. Thus, the center position of the groove of the optical disc can be kept at the reference level of the DPP signal, and the laser spot under the track-locking servo control is assured to align with the center position of the groove. Meanwhile, in the repeated procedures of track jumping and track locking, the DPP signal levels meet the standard waveform with balanced positive and negative amplitudes. In addition, the synthesized gain (SPPG) obtained from the calibration device is free from being influenced by the factors such as the laser spot position error resulting from the tolerance of the inner mechanism of the pick-up head, and the track pitch deviations between different optical discs. Consequently, the device has good uniformity and stability and is suitable to be widely used in the industry.

DETAILED DESCRIPTION OF THE INVENTION

The gain calibration method for the DPP tracking in the optical storage system of the present invention will be described with reference to the accompanying drawings. The embodiments to be described later are directed to the control for lens-shift movement of the objective lens, and a step response method is used as the control method.

Figure 2:
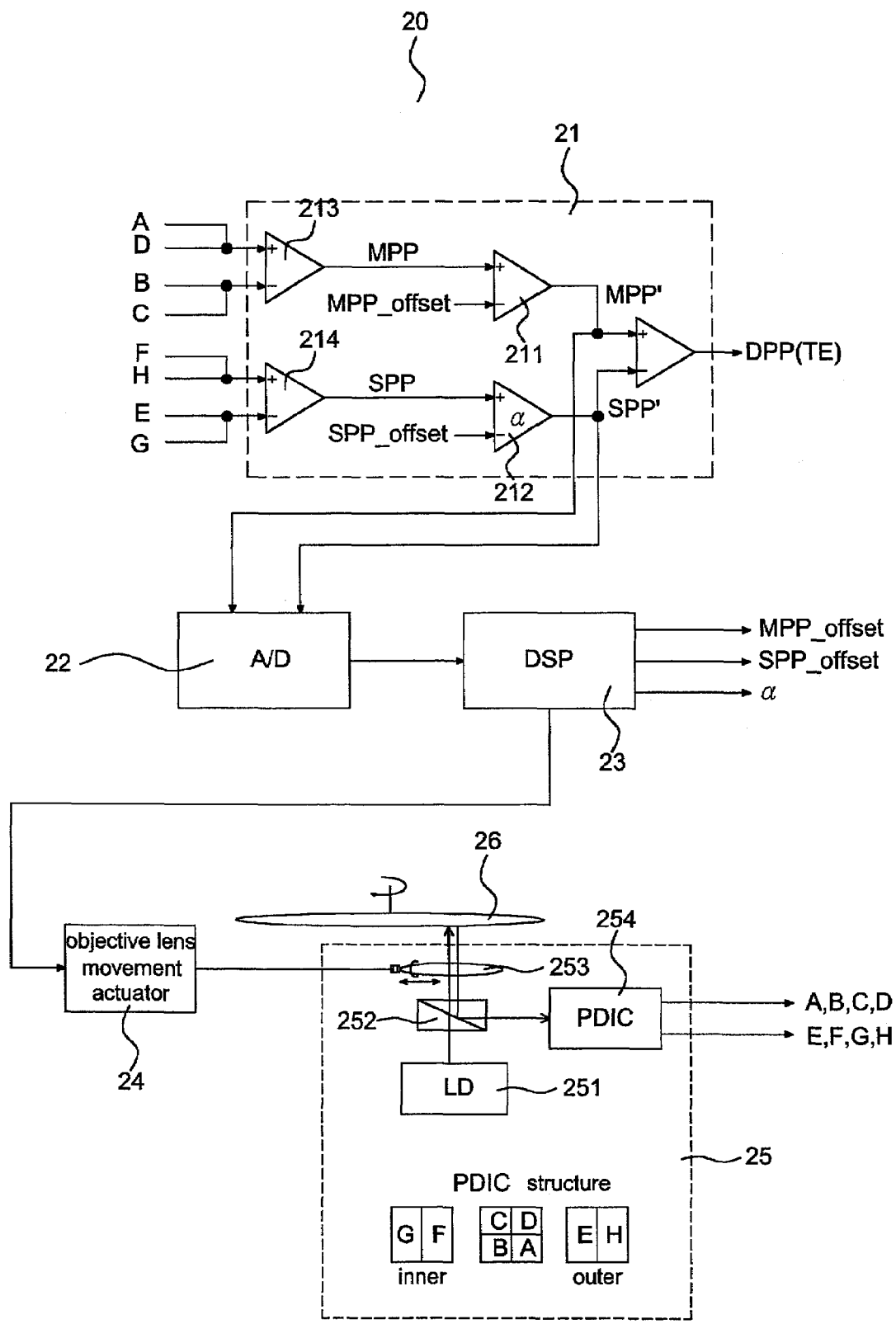
FIG. 2 shows a calibration system for DPP tracking error signals in accordance with an embodiment of the invention.

FIG. 2 shows a calibration system for DPP tracking error signals of the invention. The calibration system 20 includes a front-stage amplifier or a radio frequency IC (RFIC) 21, an analog/digital converter (A/D) 22, a digital signal processor (DSP) 23, an objective lens movement actuator 24, and an optical device 25.

The front-stage amplifier 21 receives the signals (A, B, C, D, E, F, C H) of the pick-up head outputted from the optical signal detector and amplifier 254, amplifies the signals, and synthesizes the signals to be signals needed for the track-locking servo control. The signals include a push-pull signal MPP' of the main beam, a push-pull signal SPP' of the sub beam, and a DPP error signal DPP. The push-pull signal SPP' of the sub beam is obtained using the OP amplifier 214 to merge and then differentially amplify the pick-up head signals E, F, Q H of the first sub beam and the second sub beam. Accordingly, the number of input pins of the front-stage amplifier 21 can be reduced. The push-pull signal SPP' of the sub beam is amplified by the OP amplifier 212 to generate the push-pull signal SPP' of the sub beam. The push-pull signal MPP of the main beam is obtained using the OP amplifier 213 to merge and then differentially amplify the pick-up head signals A, B, C, D. Next, the OP amplifier 211 amplifies the push-pull signal MPP to generate the push-pull signal MPP' of the main beam.

The A/D converter 22 converts the push-pull signal MPP' of the main beam and the push-pull signal SPP' of the sub beam from the analog to digital, so as to be further processed by the digital signal processor 23. The digital signal processor 23 extracts the necessary feature components from the push-pull signal MPP' of the main beam and the push-pull signal SPP' of the sub beam, and tunes the synthesized gain SPPG ($\mathbf{i}$) of the DPP tracking signal of the front-stage amplifier 21 according to the quantity of the feature components in the push-pull signal MPP' of the main beam 12 and the push-pull signals SPP' of the sub beams 13 and 14. In addition, the digital signal processor 23 further controls the objective lens 253 to move in a specific waveform and thus to change its lens offset or lens-tilt. Furthermore, the digital signal processor 23 also controls the electrical signal offsets (MPP_offset and SPP_offset) of the push-pull signal MPP' of the main beam 12 as well as the push-pull signals SPP' of the sub beams 13 and 14 in the front-stage amplifier 21 to correspond to the usage in the calibration process.

The objective lens movement actuator 24 receives the objective lens movement control signals from the digital signal processor 23 to control the movement of the objective lens 253. The objective lens movement actuator 24 may be a tracking actuator to cause the lens-shift, or a tilt actuator to cause the lens-tilt.

The optical device 25 includes a laser generating and driving circuit (LD) 251, a splitter 252, an objective lens 253, and an optical signal detector and amplifier (PDIC) 254. The laser beam is generated from the laser generating and driving circuit 251 and then passes through the splitter 252 to form a main beam 12, a first sub beam 13, and a second sub beam 14. The beams 12 to 14 pass through the objective lens 253 and are projected around the data groove of the optical disc 26. Beams reflected from the optical disc 26 are processed by the optical signal detector and amplifier (PDIC) 254 to generate opto-electronic signals A, B, C, D, E, F, G. H. The opto-electronic signals A, B, C, D are signals of the main beam, the opto-electronic signals F and G are the signals of the first sub beam, and the opto-electronic signals E and H are the signals of the second sub beam. The corresponding positions of the opto-electronic signals A to H with respect to the optical signal detector and amplifier 254 are shown in FIG. 2.

Figure 1:
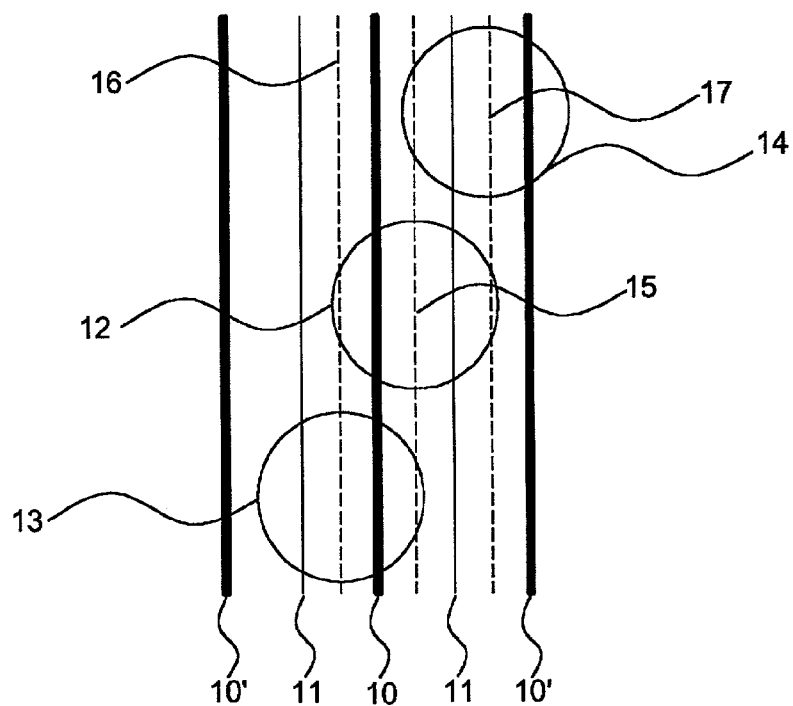
FIG. 1 shows the configuration of laser spots on optical discs for the DPP-based tracking error synthesis.
Figure 3:
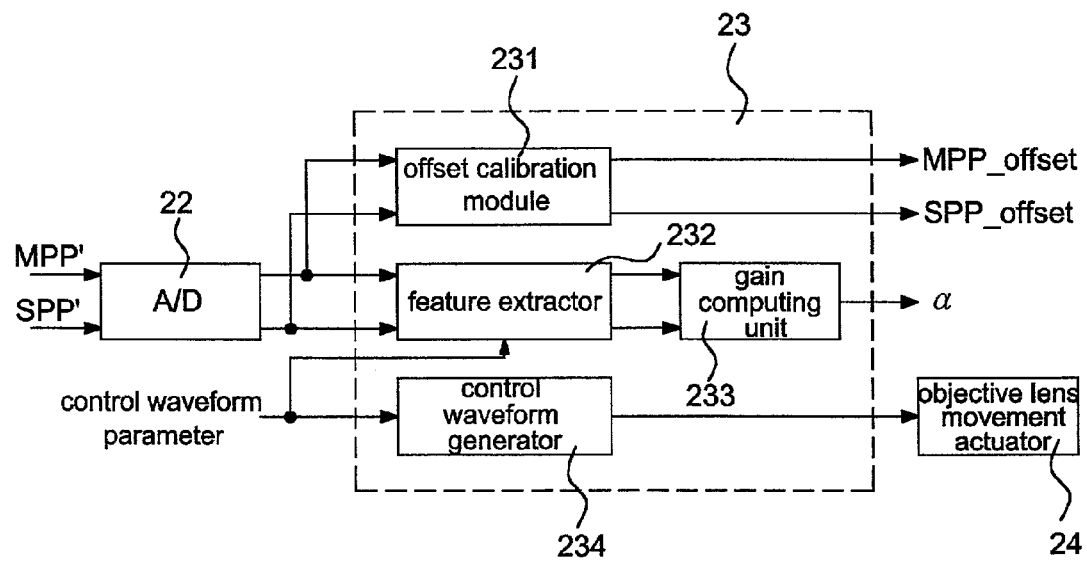
FIG. 3 is a block diagram showing the digital signal processor in the calibration system of FIG. 2.

FIG. 3 is a block diagram showing the digital signal processor 23 of FIG. 2. Referring to FIG. 3, the digital signal processor 23 includes an electrical-signal-offset calibration module 231, a feature extractor 232, a gain computing unit 233, and a control waveform generator 234. The electrical-signal-offset calibration module 231 corrects the electrical signal offset MPP_offset of the OP amplifier 211 for the main beam and corrects the electrical signal offset SPP_offset of the OP amplifier 212 for the sub beam in the front-stage amplifier 21. The feature extractor 232 extracts components relating to the lens-shift or lens-tilt in the push-pull signal MPP' of the main beam and the push-pull signal SPP' of the sub beam. For example, when the lens is shifted a distance (i.e., a step shift), the features of the push-pull signal MPP' of the main beam and the push-pull signal SPP' of the sub beam are DC components. On the other hand, when the lens is shifted in the form of a trigonometric waveform with a constant frequency, the features of the push-pull signal MPP' of the main beam and the push-pull signal SPP' of the sub beam are an averaged value.

The gain computing unit 233 computes the gain $\mathbf{i}$ of the OP amplifier for the sub beam with respect to the OP amplifier for the main beam according to the features extracted by the feature extractor 232. The control waveform generator 234 outputs the control waveform signal to the objective lens movement actuator 24 according to the control waveform parameter, thereby controlling the objective lens 253 to move or tilt to the desired positions. Consequently, the digital signal processor 23 computes the necessary parameters for the front-stage amplifier 21, according to the push-pull signal MPP' of the main beam and the push-pull signal SPP' of the sub beam outputted from the front-stage amplifier 21, and also controls the movement of the objective lens.

Figure 4:
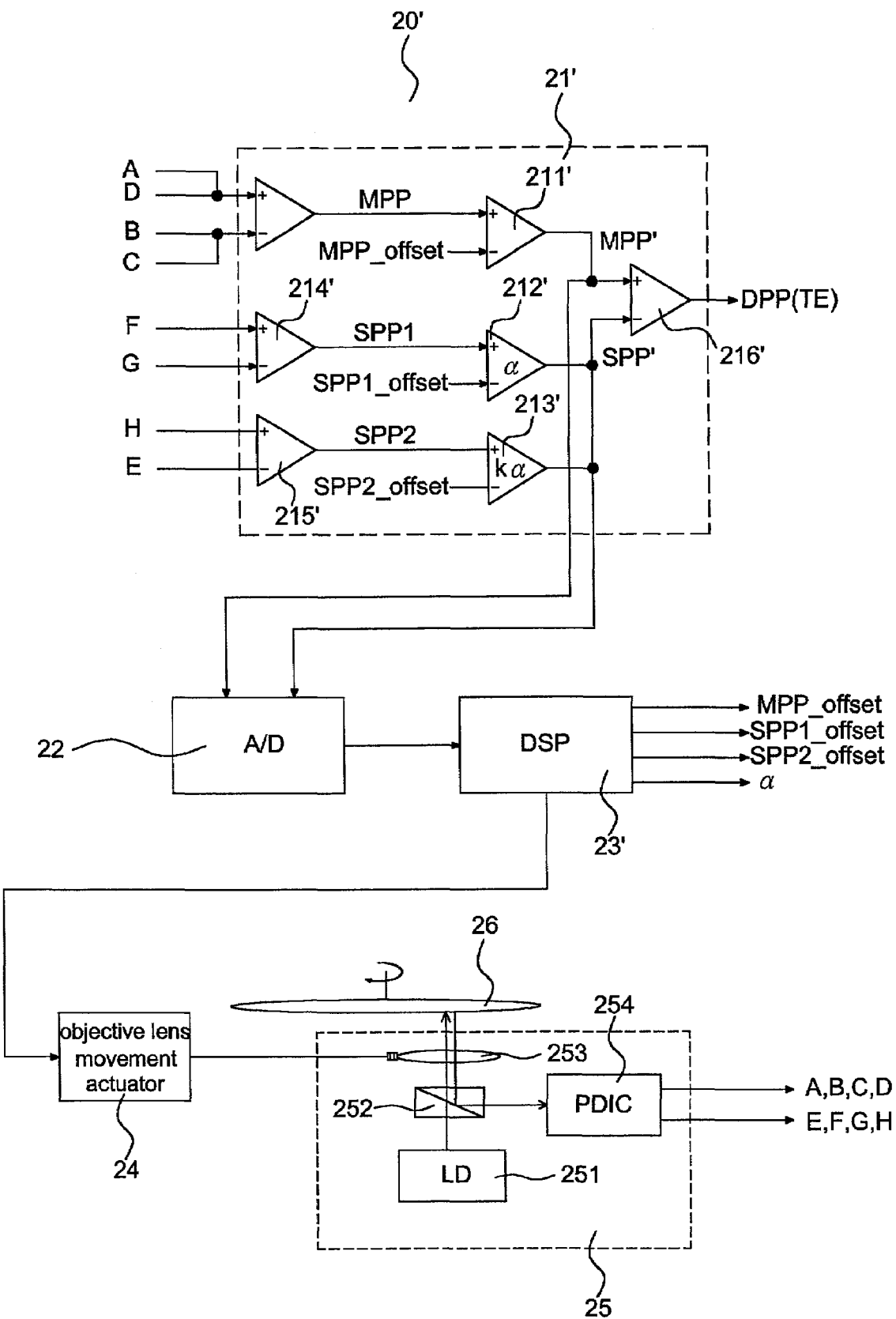
FIG. 4 shows another calibration system for DPP tracking error signals in accordance with another embodiment of the invention.

In addition, FIG. 4 shows another calibration system for the DPP tracking error signals in accordance with another embodiment of the invention. The difference between the calibration system of this embodiment and that as shown in FIG. 2 resides in that the front-stage amplifier 21' includes amplifiers 214', 212', 215', 213' for differentially amplifying and then merging the opto-electronic signals F, G of the first sub beam 13 and the opto-electronic signal E, H of the second sub beam 14, respectively. Then, an amplifier 216' differentially amplifies the merged signal together with the push-pull signal MPP' of the main beam and outputs the DPP. The configuration of the digital signal processor 23' is almost the same as that of the digital signal processor 23 with the only difference that the digital signal processor 23' has to additionally generate the SPP2_offset.

Figure 5:
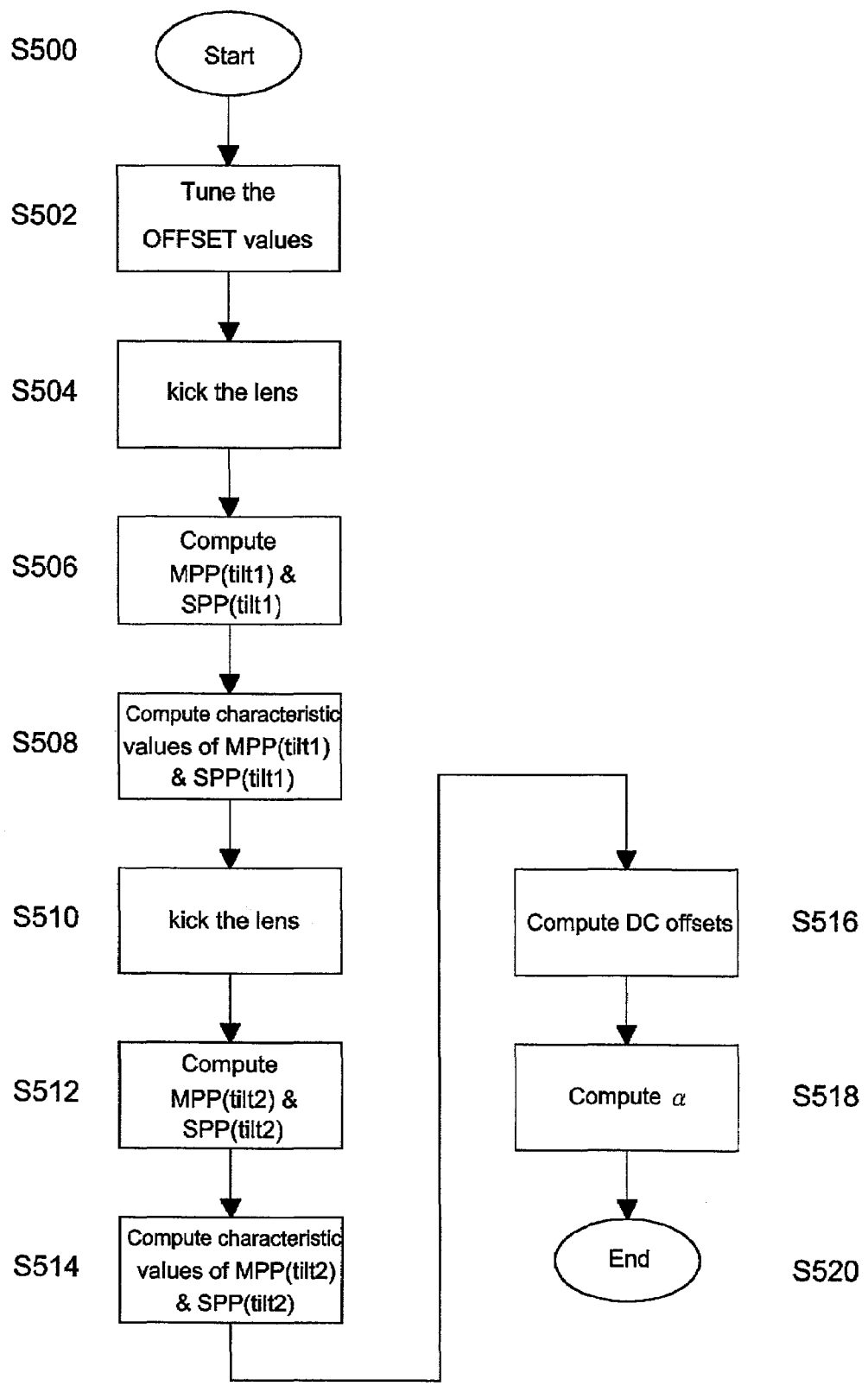
FIG. 5 is a flow chart showing the mathematical theory for the gain calibration method for DPP tracking errors in the optical storage system of the invention.
Figure 6:
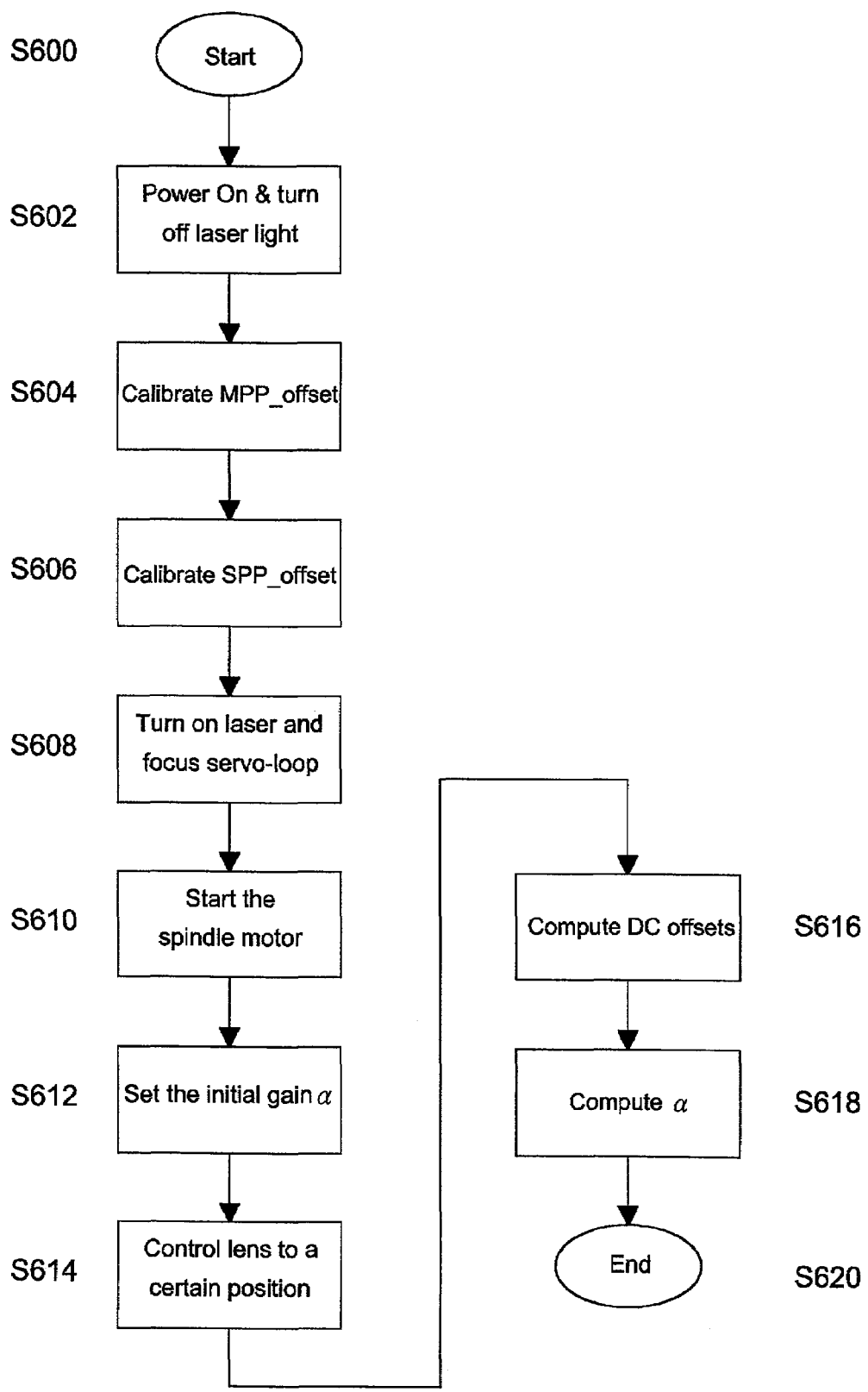
FIG. 6 is a flow chart showing the gain calibration method for DPP tracking errors in the optical storage system in accordance with an embodiment of the invention.

The gain calibration method for DPP tracking errors in the optical storage system of the invention will be described with reference to FIGS. 5 and 6. FIG. 5 is a flow chart showing mathematical theory for the gain calibration method for DPP tracking errors in the optical storage system of the invention. FIG. 6 is a flow chart showing the gain calibration method for DPP tracking errors in the optical storage system in accordance with an embodiment of the invention. In the gain calibration method of the present invention, the gain $\mathbf{i}$ of the OP amplifier for the sub beam can be correctly computed without considering the values of $A_{s1}$, $A_{s2}$, $Q_1$, and $Q_2$, and knowing the value of Q/P. In the calibration method, the gain $\mathbf{i}$ can be obtained by computing the characteristic values of the push-pull signals generated from two different lens-shifts or lens-tilts. The lens-offsets or lens-tilts of the embodiment of the invention are in the form of step response, so the characteristic values of the push-pull signals are DC components. Referring to FIG. 5, the flow chart of the mathematical theory of the invention is as follows.

Step S502: Tune the OFFSET values $C_{s1}$ and $C_{s2}$ of the circuit to be 0. Of course, this step may also be omitted.

Step S504: Actuate or kick the lens, wherein the control waveform signal outputted from the digital signal processor 23 is used to actuate the objective lens actuator 24 to move or rotate the lens 253, so that the lens 253 forms a first offset tilt1.

Step S506: Compute the values of the main beam push-pull signal MPP(tilt1) and the sub beam push-pull signal SPP(tilt1) under the condition of the first offset tilt1. The values of MPP(tilt1) and SPP(tilt1) are generated under the condition of the first offset tilt1 according to Equations (2) and (3), as shown in Equations (7) and (8).

$$MPP(tilt1) = A_m \cdot \sin\left(\frac{2\pi x}{P}\right) + A_m \cdot K(tilt1) + C_m \quad (7)$$

$$SPP(tilt1) = \left(A_{S1} \cdot \cos\left(\frac{2\pi Q_1}{P}\right) + A_{S2} \cdot \cos\left(\frac{2\pi Q_2}{P}\right)\right) \cdot \sin\left(\frac{2\pi x}{P}\right) + \left(A_{S2} \cdot \sin\left(\frac{2\pi Q_2}{P}\right) - A_{S1} \cdot \sin\left(\frac{2\pi Q_1}{P}\right)\right) \cdot \cos\left(\frac{2\pi x}{P}\right) + (A_{S1} + A_{S2}) \cdot K(tilt1) + (C_{S1} + C_{S2}) \quad (8)$$

Step S508: Extract the characteristic values (DC values) of the MPP(tilt1) and SPP(tilt1) under the condition of the first offset tilt1. That is, the AC components in Equations (7) and (8) are filtered off, and the DC values thereof are shown as Equations (9) and (10).

$$DC\{MPP(tilt1)\} = A_m \cdot K(tilt1) + C_m \quad (9)$$

$$DC\{SPP(tilt1)\} = (A_{S1} + A_{S2}) \cdot K(tilt1) + (C_{S1} + C_{S2}) \quad (10)$$

Step S510: Actuate or kick the lens again to make the lens form a second offset tilt2.

Step S512: Compute the values of MPP(tilt2) and SPP(tilt2) under the condition of the second offset tilt2. The values of the MPP(tilt2) and SPP(tilt2) under the condition of the second offset tilt2 are generated according to Equations (2) and (3), and are shown as Equations (11) and (12).

$$MPP(tilt2) = A_m \cdot \sin\left(\frac{2\pi x}{P}\right) + A_m \cdot K(tilt2) + C_m \quad (11)$$

$$SPP(tilt2) = \left(A_{S1} \cdot \cos\left(\frac{2\pi Q_1}{P}\right) + A_{S2} \cdot \cos\left(\frac{2\pi Q_2}{P}\right)\right) \cdot \sin\left(\frac{2\pi x}{P}\right) + \left(A_{S2} \cdot \sin\left(\frac{2\pi Q_2}{P}\right) - A_{S1} \cdot \sin\left(\frac{2\pi Q_1}{P}\right)\right) \cdot \cos\left(\frac{2\pi x}{P}\right) + (A_{S1} + A_{S2}) \cdot K(tilt2) + (C_{S1} + C_{S2}) \quad (12)$$

Step S514: Extract the characteristic values (DC values) of the MPP(tilt2) and SPP(tilt2) under the condition of the second offset tilt2. That is, the AC components in Equations (11) and (12) are filtered off, and the DC values thereof are shown as Equations (13) and (14).

$$DC\{MPP(tilt2)\} = A_m \cdot K(tilt2) + C_m \quad (13)$$

$$DC\{SPP(tilt2)\} = (A_{S1} + A_{S2}) \cdot K(tilt2) + (C_{S1} + C_{S2}) \quad (14)$$

Step S516: Compute the DC offsets MD and SD of the MPP and SPP under the condition of the first offset tilt1 and the second offset tilt2, as shown in Equations (15) and (16).

$$MD = DC\{MPP(tilt2)\} - DC\{MPP(tilt1)\} = A_m \cdot \{K(tilt2) - K(tilt1)\} \quad (15)$$

$$SD = DC\{SPP(tilt2)\} - DC\{SPP(tilt1)\} = (A_{S1} + A_{S2}) \cdot \{K(tilt2) - K(tilt1)\} \quad (16)$$

Step S518: Define and compute $$\alpha = \frac{MD}{SD} = \frac{A_m}{A_{S1} + A_{S2}},$$

and to substitute it into the Equation (4) to obtain Equation (17).

$$TE = MPP - \alpha \cdot SPP \quad (17)$$

$$= \left(A_m - \frac{A_m}{A_{S1} + A_{S2}} \cdot \left(A_{S1} \cdot \cos\left(\frac{2\pi Q_1}{P}\right) + A_{S2} \cdot \cos\left(\frac{2\pi Q_2}{P}\right)\right)\right) \cdot \sin\left(\frac{2\pi x}{P}\right) - \alpha \cdot \left(A_{S2} \cdot \sin\left(\frac{2\pi Q_2}{P}\right) - A_{S1} \cdot \sin\left(\frac{2\pi Q_1}{P}\right)\right) \cdot \cos\left(\frac{2\pi x}{P}\right) + 0 \cdot K(tilt) + (C_m - \alpha \cdot (C_{S1} + C_{S2}))$$

Consequently, it can be found, from the Equation (17), that the tracking error signal TE is independent with the variable of K(tilt). That is, the tracking error signal TE is free from being influenced by the lens-tilt or lens-shift of the pick-up head. In addition, the ratio of P/Q needs not to be known and the values of $A_{s1}$, $A_{s2}$, $Q_1$, $Q_2$ need not to be limited in the method of the invention. Therefore, the gain ɪof the OP amplifier for the sub beam can be computed as long as the DC offsets MD and SD of MPP and SPP under the condition of the first offset tilt1 and the second offset tilt2 are computed.

The above-mentioned flow chart is provided for the purpose of illustrating the principle of the calibration method of the invention, while FIG. 6 is a flow chart showing the gain calibration method for DPP tracking errors in the optical storage system in accordance with the embodiment of the invention. The lens-offsets or lens-tilts are in the form of step response in this embodiment, so the characteristic values of the push-pull signals are DC components. Of course, the lens-offsets or lens-tilts may be in the form of waveform response that varies continuously. The steps of the flow chart of FIG. 6 are now described as follows.

Step S602: Turn on and turn off the power of the laser light source. In this case, the measured MPP and SPP signals by the digital signal processor 23 are electrical signal offsets from the front-stage amplifier 21 and the optical signal detector and amplifier 254.

Step S604: Calibrate MPP_offset. Under the conditions described in Step 602, measure the MPP value by the digital signal processor 23 and generate MPP_offset for the main beam amplifier 211 of the front-stage amplifier 21.

Step S606: Calibrate SPP_offset. Under the conditions described in Step 602, measure the SPP value by the digital signal processor 23 and generate the SPP_offset for the sub beam amplifier 212 of the front-stage amplifier 21.

Step S608: Turn on laser and focus servo-loop.

Step S610: Start the spindle motor to spin the optical disc, and generate runout signals in MPP, SPP and TE. At this time, the spindle motor may be controlled under the constant angular velocity (CAV) mode or the constant linear velocity (CLV) mode to keep the optical disc spinning.

Step S612: Set the initial gain α of the sub beam amplifier 212 of the front-stage amplifier 21.

Step S614: Control lens to a certain lens-shift position. Move the objective lens actuator 24 or to rotate the lens 253 to cause the lens 253 to form a lens-shift or lens-tilt according to the control waveform signals from the digital signal processor 23.

Step S616: Measure the characteristic value MD of MPP and the DC characteristic value SD of SPP by the digital signal processor 23 after the lens is stable. The measuring method is to measure the peak-to-peak value, and then sum up the peak value and the valley value and then divide the sum by 2. Alternatively, the characteristic values can be directly obtained using a low-pass filter.

Step S618: Define and set a new α value as $$\alpha = \frac{MD}{SD}.$$

Step S620: End.

There are some differences between the principle and embodiment of the flow charts as shown in FIGS. 5 and 6. As for the principle, the gain (SPPG) of the OP amplifier of SPP is computed according to two values of DC lens-shifts of MPP and SPP corresponding to two objective lens offsets, thereby proving the possibility of the method. As for the embodiment, the DC value of the initial value serves as the first DC value of MPP and SPP of the first offset and is tuned to be 0. The DC lens-shift value of MPP and SPP of another offset-tilt serves as the second DC value, thereby computing the gain (SPPG) of the OP amplifier of SPP.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For instance, although the optimum gain ratio is computed according to the value of MD/SD in the embodiment, it is also possible to set various gain ratios and select therefrom a gain, when MD=SD, as the optimum value. In addition, as for the control method for the objective lens or disc, the control waveform, and the extraction method for feature signals in the embodiment, the method of step input is adopted and the DC components are extracted for calibration. However, it is also possible to use the low-frequency sine wave, square wave, sawtooth wave having different frequency domains in the runout as control inputs, and to extract the components of the control frequency in MPP and SPP as characteristic values.

What is claimed is:

1. A gain calibration method for DPP (differential push-pull) tracking error signals in an optical storage system for correcting a ratio of an amplifier gain of a sub beam to an amplifier gain of a main beam, the gain calibration method comprising the steps of:

powering on a laser light source and focusing laser beams;

enabling a spindle motor;

controlling a first state of an objective lens relative to a disc;

measuring an eigenvalue of the push-pull signal of the main beam, with respect to an objective lens-shift, as a first main beam eigenvalue;

measuring an eigenvalue of the push-pull signal of the sub beam, with respect to the objective lens-shift, as a first sub beam eigenvalue;

controlling a second state of the objective lens relative to the disc;

measuring an eigenvalue of the push-pull signal of the main beam, with respect to an objective lens-shift, as a second main beam eigenvalue;

measuring an eigenvalue of the push-pull signal of the sub beam, with respect to the objective lens-shift, as a second sub beam eigenvalue; and computing the gain ratio of the sub beam to the main beam according to the first main beam eigenvalue, first sub beam eigenvalue, second main beam eigenvalue, and second sub beam eigenvalue.

2. The gain calibration method according to claim 1, wherein the gain ratio approaches:

(second main beam eigenvalue−first main beam eigenvalue)/(second sub beam eigenvalue−first sub beam eigenvalue).

3. The gain calibration method according to claim 1, wherein the first state of the objective lens relative to the disc is a state where the objective lens and the disc are kept at a first fixed angle and position.

4. The gain calibration method according to claim 3, wherein the second state of the objective lens relative to the disc is a state where the objective lens and the disc are kept at a second fixed angle and position.

5. The gain calibration method according to claim 4, wherein the main beam eigenvalue is the DC component of the push-pull signal of the main beam.

6. The gain calibration method according to claim 5, wherein the sub beam eigenvalue is the DC component of the push-pull signal of the sub beam.

7. A gain calibration method for DPP (differential push-pull) tracking error signals in an optical storage system for correcting a ratio of an amplifier gain of a sub beam to an amplifier gain of a main beam, the gain calibration method comprising the steps of:

turning off a laser light source;

calibrating a circuit signal offset of a main beam amplifier, wherein the circuit signal offset of the main beam amplifier in a radio frequency IC is set to cause the output of the amplifier to be a first main beam eigenvalue;

calibrating a circuit signal offset of a sub beam amplifier, wherein the circuit signal offset of the sub beam amplifier in the radio frequency IC is set to cause the output of the amplifier to be a first sub beam eigenvalue;

powering on the laser light source and focusing laser beams;

enabling a spindle motor;

changing a lens-shift value of a lens relative to a disc;

measuring an eigenvalue of the push-pull signal of the main beam, with respect to the objective lens-shift, as a second main beam eigenvalue;

measuring an eigenvalue of the push-pull signal of the sub beam, with respect to the objective lens-shift, as a second sub beam eigenvalue; and computing the gain ratio of the sub beam to the main beam according to the first main beam eigenvalue, first sub beam eigenvalue, second main beam eigenvalue, and second sub beam eigenvalue.

8. The gain calibration method according to claim 7, wherein the gain ratio approaches:

(second main beam eigenvalue−first main beam eigenvalue)/(second sub beam eigenvalue−first sub beam eigenvalue).

9. The gain calibration method according to claim 7, wherein the first main beam eigenvalue is 0.

10. The gain calibration method according to claim 9, wherein the first sub beam eigenvalue is 0.

11. The gain calibration method according to claim 10, wherein the gain ratio approaches:

(second main beam eigenvalue/second sub beam eigenvalue).

12. A gain calibration device for DPP (differential push-pull) tracking error signals in an optical storage system for correcting a ratio of an amplifier gain of a sub beam to an amplifier gain of a main beam, the gain calibration device comprising:

an optical signal amplifier for receiving signals of the main beam and the sub beam from a disc, amplifying the signals, and outputting them as a main beam radio frequency signal and a sub beam radio frequency signal;

a radio frequency receiver for differentially amplifying, in a front-stage, the main beam radio frequency signal and the sub beam radio frequency signal of the optical signal amplifier, for differentially amplifying the amplified signals by a main beam signal amplifier and a sub beam signal amplifier, for generating a main beam push-pull signal and a sub beam push-pull signal, and for outputting the value of (sub beam push-pull signal—main beam push-pull signal) as the DPP tracking error signal;

an analog to digital converter for receiving the main beam push-pull signal and the sub beam push-pull signal from the radio frequency receiver, and generating a digital main beam push-pull signal and a digital sub beam push-pull signal; and a digital signal processor for receiving the digital main beam push-pull signal and the digital sub beam push-pull signal, extracting eigenvalues of the digital main beam push-pull signal and the digital sub beam push-pull signal using a feature extractor, and computing, using a gain computing module, a gain ratio of the sub beam signal amplifier of the radio frequency receiver to the main beam signal amplifier according to the eigenvalues of the push-pull signal.

13. The gain calibration device according to claim 12, further comprising an objective lens actuator to control the position and angle of the objective lens relative to the disc.

14. The gain calibration device according to claim 13, wherein the digital signal processor further comprises a control waveform generator for generating a control signal for the objective lens actuator according to a control waveform parameter.

15. The gain calibration device according to claim 12, wherein the digital signal processor further comprises a circuit signal offset calibration module of an amplifier, for computing the circuit signal offset of the main beam signal amplifier relative to the sub beam signal amplifier according to the digital main beam push-pull signal and the digital sub beam push-pull signal, and outputting the amplified circuit signal offset to the radio frequency receiver.

16. The gain calibration device according to claim 12, wherein the feature extractor extracts signals influenced by the position and angle of the objective lens relative to the disc in the main beam push-pull signal and the sub beam push-pull signal.

* * * * *